(12) United States Patent
Gold et al.

(10) Patent No.: US 7,588,291 B2
(45) Date of Patent: Sep. 15, 2009

(54) BREATHABLE INFANT SUPPORT PAD AND HEAD SUPPORT

(75) Inventors: Katherine Gold, Denver, CO (US); Lynn Rosen, Parker, CO (US)

(73) Assignee: Gold Bug, Inc., Aurora, CO (US)

( * ) Notice: Subject to any disclaimer, the term of this patent is extended or adjusted under 35 U.S.C. 154(b) by 0 days.

(21) Appl. No.: 11/821,923

(22) Filed: Jun. 26, 2007

(65) Prior Publication Data

US 2009/0001801 A1    Jan. 1, 2009

(51) Int. Cl.
A47C 31/00    (2006.01)
(52) U.S. Cl. ............................ 297/219.12; 297/452.47; 5/655; 5/724; 5/638
(58) Field of Classification Search ............ 297/219.12, 297/219.1, 452.43, 452.46, 452.47; 5/655, 5/724, 638
See application file for complete search history.

(56) References Cited

U.S. PATENT DOCUMENTS

| | | | | |
|---|---|---|---|---|
| 3,298,047 A * | 1/1967 | Feinerman | ................ | 297/452.6 |
| 3,323,152 A * | 6/1967 | Lerman | ...................... | 5/655.9 |
| 3,331,089 A * | 7/1967 | Ornas, Jr. et al. | ........ | 297/452.47 |
| 3,381,999 A * | 5/1968 | Steere, Jr. | .............. | 297/452.47 |
| 3,736,022 A * | 5/1973 | Radke | .................... | 297/452.43 |
| 4,184,237 A * | 1/1980 | Blankenship | ................ | 29/91.1 |
| 4,891,454 A * | 1/1990 | Perdelwitz et al. | .......... | 428/137 |
| 5,226,188 A * | 7/1993 | Liou | ............................. | 5/653 |
| 5,383,711 A | 1/1995 | Houghteling | | |
| 5,429,852 A * | 7/1995 | Quinn | .......................... | 428/71 |
| 5,586,351 A * | 12/1996 | Ive | ................................ | 5/655 |
| 5,806,925 A * | 9/1998 | Hanley | ....................... | 297/229 |
| 5,842,739 A * | 12/1998 | Noble | ................... | 297/219.12 |
| 5,916,089 A * | 6/1999 | Ive | ................................ | 5/655 |
| 5,979,981 A * | 11/1999 | Dunne et al. | ........... | 297/219.12 |
| 6,036,263 A | 3/2000 | Gold | | |
| 6,296,307 B1 * | 10/2001 | Holtke | .................... | 297/219.12 |
| 6,363,558 B1 * | 4/2002 | Dunne | .......................... | 5/655 |
| 6,428,098 B1 * | 8/2002 | Allbaugh | ............... | 297/219.12 |
| 6,547,327 B1 * | 4/2003 | Yates | .......................... | 297/214 |
| 6,629,725 B1 * | 10/2003 | Kunkel et al. | .......... | 297/180.12 |
| 6,817,675 B2 * | 11/2004 | Buss et al. | ............... | 297/452.6 |
| 6,966,089 B2 | 11/2005 | Gold et al. | | |
| 6,976,734 B2 * | 12/2005 | Stoewe | ................... | 297/180.14 |
| 7,040,710 B2 * | 5/2006 | White et al. | ........... | 297/452.46 |
| 7,070,232 B2 * | 7/2006 | Minegishi et al. | ...... | 297/180.14 |
| 7,083,236 B1 * | 8/2006 | Smith | .................... | 297/452.43 |
| 7,100,978 B2 * | 9/2006 | Ekern et al. | ............ | 297/180.11 |
| 7,213,876 B2 * | 5/2007 | Stoewe | ................... | 297/180.14 |
| 7,322,643 B2 * | 1/2008 | Ishima et al. | ............ | 297/180.1 |
| 2002/0014793 A1* | 2/2002 | Santha | ................... | 297/219.12 |
| 2003/0193223 A1* | 10/2003 | Norman | ................. | 297/219.12 |
| 2004/0104607 A1* | 6/2004 | Minegishi et al. | ...... | 297/180.14 |

(Continued)

*Primary Examiner*—Peter R Brown
*Assistant Examiner*—James Alex
(74) *Attorney, Agent, or Firm*—The Reilly Intellectual Property Law Firm, P.C.; Ellen Reilly

(57) ABSTRACT

An infant support member, particularly for use with babies or smaller infants includes a padded base layer provided with spaced openings, a porous cover with smaller openings, and a head support member at one end of the base member for supporting and protecting an infant's head and neck, the head support member also including spaced openings and a ventilated cover for additional ventilation around the head portion, and releasable fasteners enable adjustment of the sides of the head support.

20 Claims, 6 Drawing Sheets

U.S. PATENT DOCUMENTS

2005/0173950 A1* 8/2005 Bajic et al. ............. 297/180.14
2006/0260057 A1* 11/2006 Dunn et al. .................... 5/655
2007/0266498 A1* 11/2007 Lord et al. ...................... 5/655
2008/0073966 A1* 3/2008 Ali et al. ................ 297/452.46

* cited by examiner

BREATHABLE INFANT SUPPORT PAD AND HEAD SUPPORT

BACKGROUND AND FIELD

The following relates to infant seats and head supports; and more particularly relates to a novel and improved porous but firm infant seat and head support.

Infant seats with head supports are well known but the head supports that surround the infant's head can be extremely confining and uncomfortable. The same is true of the padding or base layer and it is not sufficient merely to employ porous material, which tends to be compressed and therefore prevent adequate ventilation. The infant head supports are typically designed to surround an infant's head with a cushion or head roll that is not permanently deformable. For instance U.S. Pat. No. 5,383,711 issued to Houghteling, discloses a head support device that supports the lateral sides of the infant's head from sudden movement or impact. Other examples of infant head supports are disclosed in assignee's U.S. Pat. Nos. 6,036,263 and 6,966,089 and there is a demand for a soft but ventilated pad surrounding an infant's head as well as a ventilated base layer.

It is therefore desirable to provide a breathable infant seat for an infant, which will not only protect the head and neck of an infant from sudden movement or impact but also offer adequate ventilation of the head and body so as to avoid suffocation and extreme discomfort.

SUMMARY

It is therefore desirable to provide for a novel and improved body and head support for infants that is well-ventilated but provides adequate support for an infant, that prevents lateral and forward movement of the head, and that aids in retaining an infant in a reposed, comfortable position; and wherein the seat and head support can be used as a car seat, stroller, bed, or couch or on other flat surfaces.

In one aspect, there is provided an infant support pad with a padded base member adapted to extend along a substantial length of an infant's body and having openings at spaced intervals, a porous cover with smaller openings, and deformable head support means includes a ventilated cover layer surrounding a padding in the form of an upright rail with spaced openings at one end of the base member for supporting and protecting an infant's head and neck. The head support means performs the dual functions of preventing lateral movement of an infant's head while providing a flexible, ventilated support.

In another aspect, the head support is adjustable and includes means for adjusting the support member, such as, a releasable fastener on each side so that the sides and distal ends of the support member can be extended inwardly to form a protective shell around the head of an infant.

The above and other objects, advantages and features will become more readily appreciated and understood from a consideration of the following detailed description when taken together with the accompanying drawings in which:

DETAILED DESCRIPTION OF ONE EMBODIMENT

Figure 1:
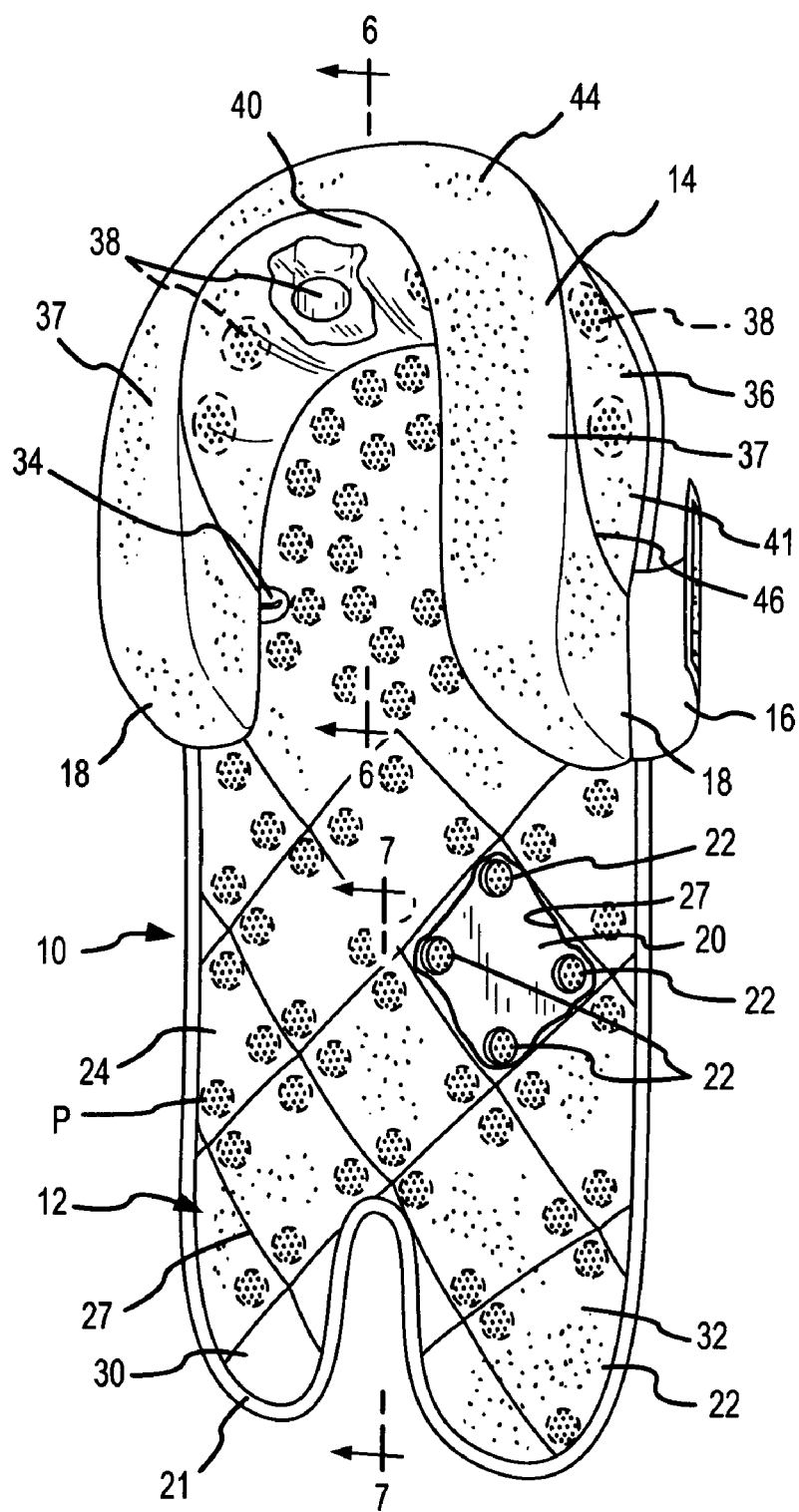
FIG. 1 is a front perspective view of one embodiment of an infant seat.
Figure 2:
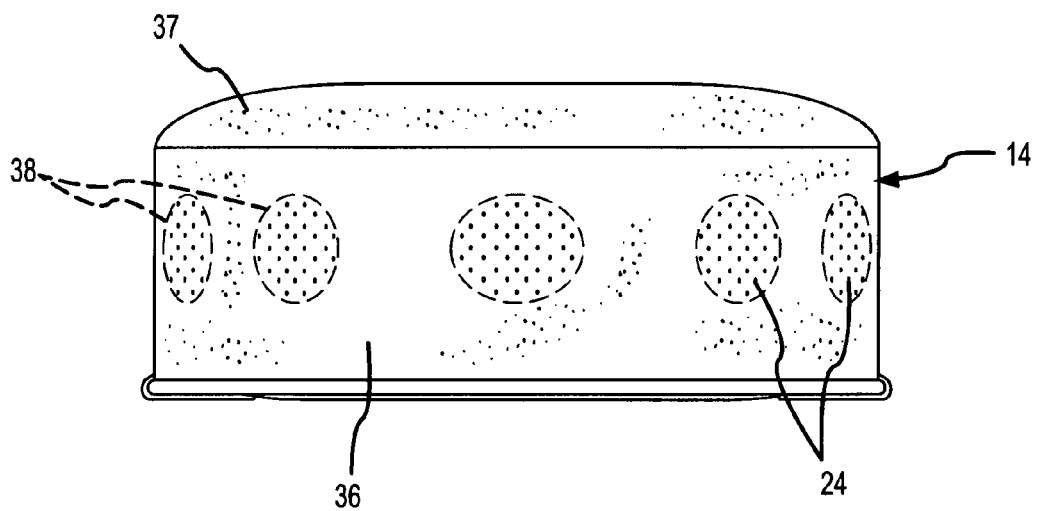
FIG. 2 is an end view of the embodiment of FIG. 1 with side restraints in a closed position.
Figure 3:
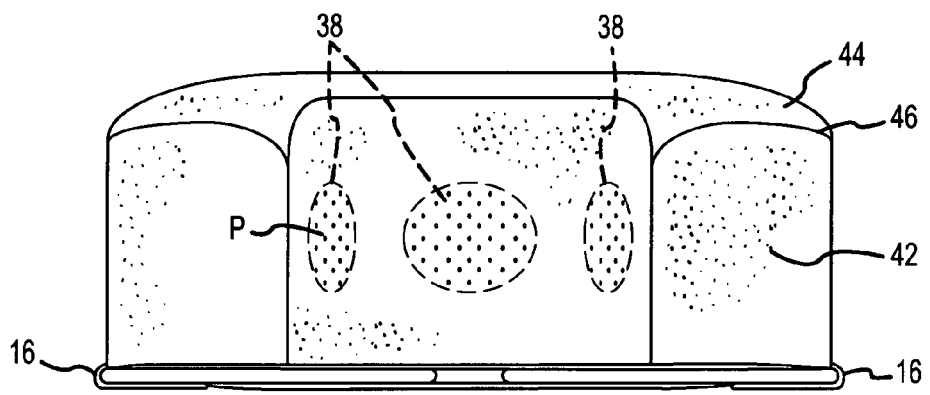
FIG. 3 is an opposite end view to that of FIG. 2.
Figure 4:
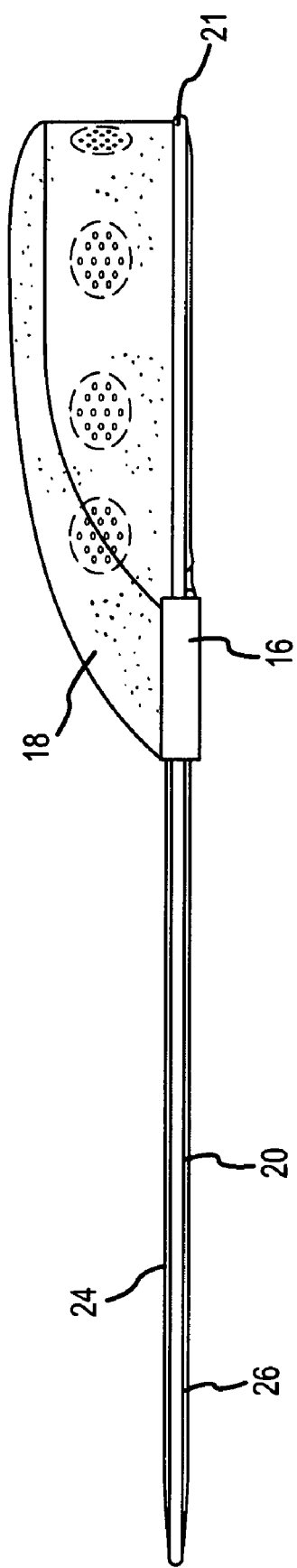
FIG. 4 is a side elevational view of the embodiment of FIG. 1.

Referring in more detail to the drawings there is shown by way of illustrative example in FIGS. 1 to 8 an infant support 10 including a padded base member 12 and a head support rail 14 with side restraint members 16 to releasably secure opposite free ends 18 of the head rail 14 to the base member 12. As shown in FIG. 1, the infant support 10 is conformable for use either in a flat or folded position in an infant car seat, stroller, baby carriage, crib, infant support seat, changing table or any other surface where it is desirable to support an infant's body as well as the head and neck. In particular, the support 10 comprises a ventilated base member 12 as well as a ventilated head support 14. To this end, the base member 12 is made up of an elongated pad 20 of a sponge-like material of substantially uniform thickness having uniformly spaced openings in the form of through-bores 22 which are arranged in a diagonal or other orientation or pattern throughout the greater length of the pad 20; and the pad 20 is encased between upper and lower mesh or perforated layers 24 and 26, respectively. The upper and lower layers 24 and 26 are preferably composed of a cotton fabric or a synthetic material that is waterproof for easy clean-up, and the upper and lower layers 24 and 26 have small openings or perforations P aligned at least over opposite ends of each opening 22.

The outer layers 24 and 26 are of uniform thickness and terminate in a reinforced surrounding edge or hem 21 that extends along the entire periphery of the base layer 13. The layers 24 and 26 are united to the pad 20 by a series of seams 27 running diagonally in crisscross fashion along the greater length and breadth of the base member 12, except for the region within the head support rail 14 so as to divide the pad 20 into a series of diamond-shaped or square sections each having a bore 22 in each corner as best seen from FIG. 1. In FIG. 1, one of the sections has the upper layer 24 removed to more clearly illustrate the bores 22. The base member 12 is of a length to support a baby's or young infant's body, and a foot portion 28 opposite to the head support rail 14 may be solid or bifurcated to form leg portions 30 and 32. The base member 12 also includes a side notch 34 on each side of the base member 12 beneath the ends of the head support member 14, as shown in FIGS. 1 and 8, which are designed to receive a seat belt harness or other safety straps, not shown, in order to restrain the infant in a seated position, for example, in a car seat.

Figure 5:
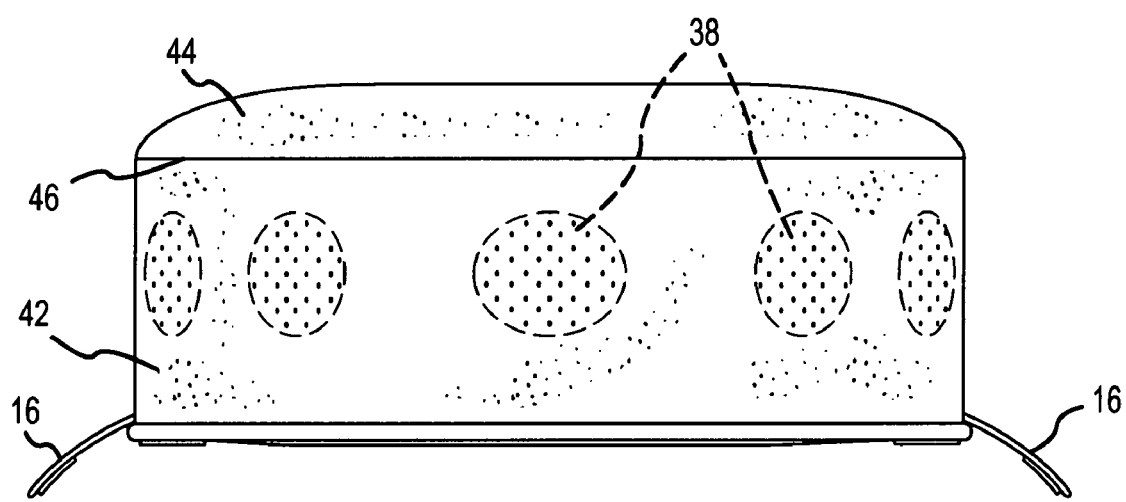
FIG. 5 is an end view of the embodiment of FIG. 1 with the side restraints released.
Figure 6:
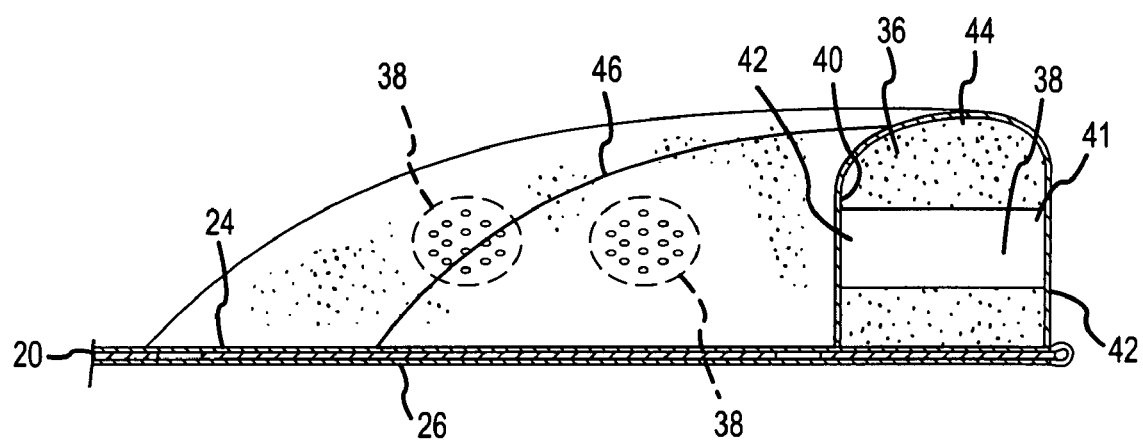
FIG. 6 is a cross-sectional view taken about lines 6-6 of FIG. 1.
Figure 7:
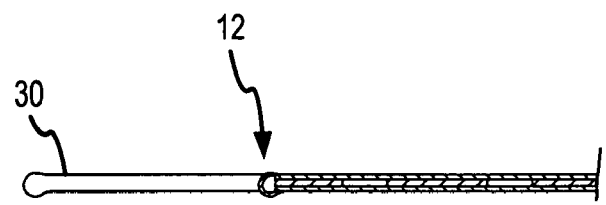
FIG. 7 is a cross-sectional view taken about lines 7-7 of FIG. 1.

A head end portion of the base layer 12 opposite to the foot portion includes the deformable head support rail 14, which is of generally U-shaped configuration so as to follow the rounded contour at that end of the base member 12. The outside of the head support rail 14 is attached to the base member 12 by suitable stitching or seams along the outer, upper edge 21 of the base member 12, except along the free ends 18 which are releasably secured by the side restraint flaps 16 as shown in FIGS. 1 and 5. The head support rail member 14 is designed to form a protective, conformable shell around an infant's head, neck and shoulders. For this purpose, the head support rail includes an inner body 36 composed of a spongy material which is generally rectangular in cross-section with an upper rounded surface 37 and has a series of openings or bores 38 extending transversely through the body 36 at uniformly spaced intervals along the end and sides at the mid-section of the body parallel to the base member 12.

When the base member 12 is laying flat, the body 36 of the rail 14 defines spaced inner and outer vertical walls 40 and 41, respectively, which are covered by mesh or perforated layers 42 corresponding to the cover layers 24 and 26. The upper rounded surface portion 37 is covered by a finer mesh layer 44 which is sewn or otherwise attached to the layers 42 along the seams 46. In this way, the most critical area in terms of open ventilation is covered by the coarser or more open mesh material surrounding the head to permit the free passage of air through the bores 38 and perforations as represented at P. On the other hand, the mesh layer 44 may have little or no passage of air through it but primarily covers the solid areas of the body 36.

Figure 8:
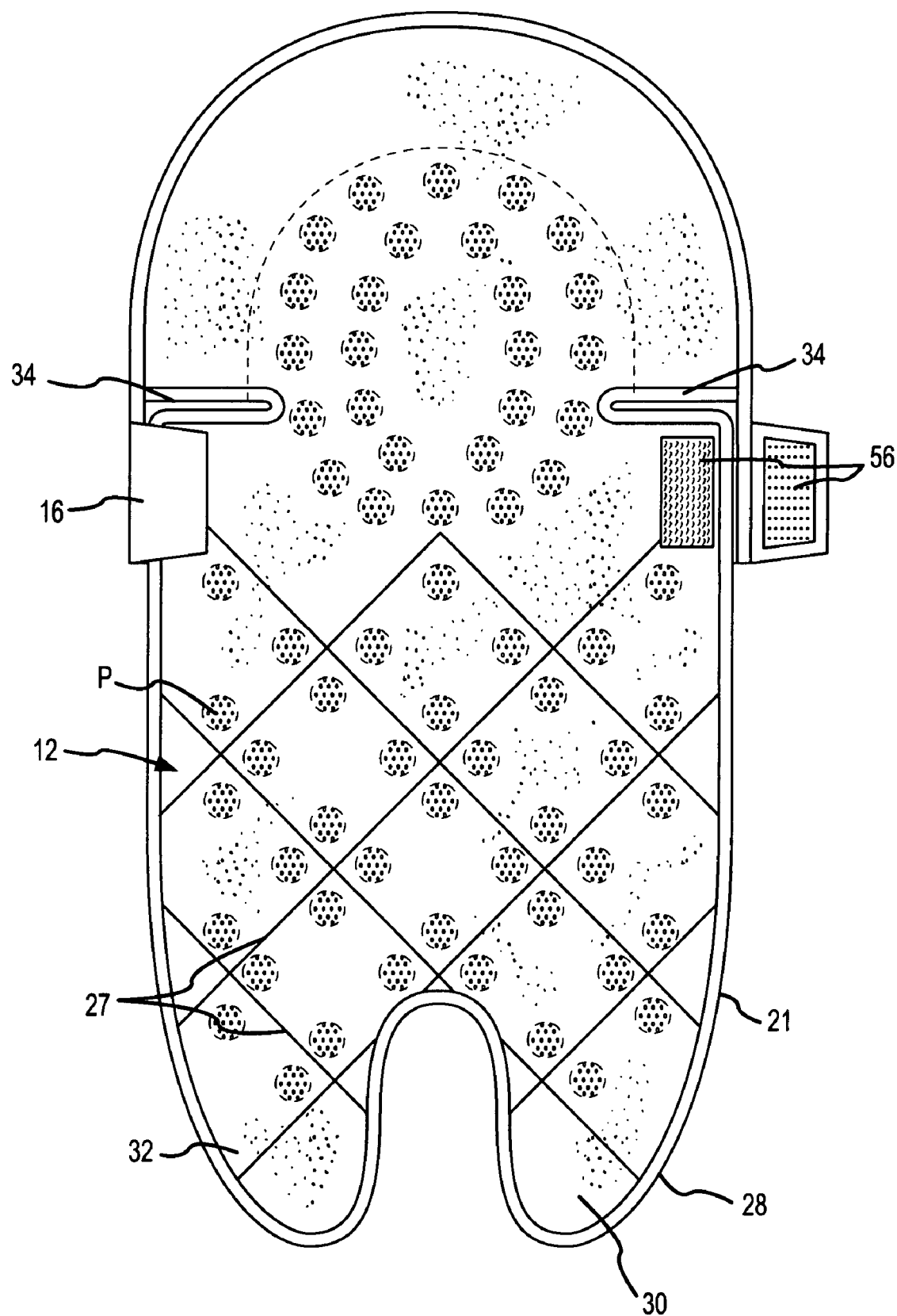
FIG. 8 is a bottom plan view of the underside of the support.

The side restraint flaps 16 are attached to the undersides of the free ends 18 and extend downwardly over the sides of the base member 12 for attachment to the underside by complementary hook and loop fasteners represented at 50 in FIG. 8. By connecting the flaps 16 to the base member 12 the infant's head and neck are supported against sudden or extreme lateral movements. When the flaps 16 are released, the free ends 18 overlying the notches can either be raised or bent outwardly away from the base member 12 to insert a seat belt or harness, not shown, around the infant.

In use, an infant may be placed on the base member 12, the head of the infant placed within the support rail 14 and the restraints 16 being adjusted to snugly fit around an infant's head, depending upon the size of the infant.

The spaced openings 22 in the padding of the base member 12 are dimensioned such that they will remain open when compressed, for example, from the weight of an infant being placed on the pad and may be varied in size over a wide range. The same is true of the spaced openings 38 in the body of the head support. The spaced openings 22 and 38 may be of different configurations so long as they do not unduly weaken their respective paddings. The openings or mesh sizes of the cover layers 24, 26, and 42 are substantially smaller than the spaced openings just described in order to better diffuse the passage of air through the spaced openings 22 and 38 and lend some reinforcement to the base member 12 as well as head support member 14.

From the foregoing, it will be appreciated that the head support member or rail 14 can form right angles with the base member 12 or simply lay flat in an inclined or horizontal position. The head support rail 14 can be composed of a semi-rigid or firm, relatively inflexible foam body 36 to keep the head support upright and prevent compression of the opening 38 and air blockage. Thus the semi-rigid or firm walls of the head support rail 14 will minimize any tendency of the base member to collapse or bend around the head region of an infant and therefore achieve better support, particularly in the upright position.

It is therefore to be understood that while one embodiment is herein set forth and described, the above and other modifications may be made therein without departing from the spirit and scope of the invention as defined by the appended claims and reasonable equivalents thereof.

We claim:

1. A breathable infant support member comprising:
   a padded base panel adapted to extend along a substantial length of an infant's body having an inner pad with enlarged spaced openings extending through said inner pad, and of a size sufficient to remain open notwithstanding compression of said inner padding, an outer porous layer covering said inner pad, seams dividing said inner pad into a series of diamond-shaped sections, each having an opening in each corner of said section; and
   head support means including an upright padding member at one end of said base panel with spaced openings therein of size substantially corresponding to said enlarged openings, said padding member surrounding an infant's head and neck, and an outer layer covering said padding member including porous portions over said spaced openings for the passage of air through said spaced openings and said porous portions.

2. The infant support member according to claim 1 wherein said pad and said padding member are encased within outer perforated layers.

3. The infant support member according to claim 2 wherein said outer layers are joined to said pad at spaced intervals.

4. The infant support member according to claim 3 wherein said outer layers are joined to said pad by said seams.

5. The infant support member according to claim 1 wherein said head support member includes a flexible body of generally rectangular cross-section provided with spaced openings extending therethrough.

6. The infant support member according to claim 5 wherein said body is of generally U-shaped configuration attached to one end of said base layer.

7. The infant support member according to claim 5 wherein said head support member is U-shaped and said body is covered by an outer porous layer.

8. A breathable infant support member comprising:
   a padded base member having a head support at one end and an elongated flexible pad extending for the greater length of said base member;
   a substantially U-shaped head rail surrounding said head support at the one end of said padded base member, said elongated pad having enlarged openings at spaced intervals extending therethrough and of a size sufficient to remain open notwithstanding compression of said elongated pad, and webbed upper and lower encasing layers with ventilation openings and terminating in a reinforced hem surrounding said base member;
   said base member having intermediate seams extending diagonally with respect to said hem only along said elongated pad dividing said pad into a series of diamond-shaped sections, each having one of said openings in each corner of said section; and
   said head rail movable between an upright and a horizontal position with respect to said base member and including a padding member provided with spaced openings therein of a size substantially corresponding to said enlarged openings.

9. The infant support member according to claim 8 wherein said head rail includes means for fastening said head rail to said base member and having side restraint flaps extending between said base member and opposite sides of said head rail.

10. The infant support member according to claim 9 wherein said side restraint flaps extend downwardly from said opposite sides and are releasably connected to said base layer.

11. The infant support member according to claim 10 wherein each of said flaps includes hook-and-loop fasteners between said flaps and said base layer.

12. The infant support member according to claim 10 wherein said base member is provided with notches on opposite sides of said base member adjacent to said opposite sides of said head rail.

13. A breathable infant support member comprising;
an elongated flexible base member having an inner padding provided with enlarged openings at spaced intervals extending through the thickness of said base member, and of a size sufficient to remain open notwithstanding compression of said inner padding, and an outer porous layer covering said member;
seams dividing said inner padding into a series of diamond-shaped sections, each having one of said enlarged openings in each corner of said section; and
a head support rail of generally U-shaped configuration at one end of said base member including a padding member provided with spaced openings therein of a size substantially corresponding to said enlarged openings, and an outer layer covering said padding member including porous portions over said spaced openings for the passage of air through said spaced openings and said porous portions.

14. The infant support member according to claim 13 wherein opposite sides of said head support rail terminate in free ends that project downwardly and inwardly to form a self-supporting head support.

15. The infant support member according to claim 13 wherein said outer porous layer includes upper and lower layers encasing said inner padding and terminating in a reinforced hem surrounding said base member.

16. An infant support member according to claim 15, wherein said upper and lower layers are united to said inner padding by diagonally extending seams extending in criss-cross fashion along a portion of said base member.

17. An infant support member according to claim 13 wherein said inner padding is substantially thinner than said padding member of said head rail.

18. An infant support member according to claim 13 wherein said padding member of said head support rail is generally rectangular in cross-section and provided with an upper rounded surface, and a cover layer of a finer mesh size than said outer layer extends over said upper rounded surface.

19. The infant support member according to claim 1 wherein said seams form quilted portions along said base panel.

20. The breathable infant support of claim 8 wherein said head rail is movable between an upright and a horizontal position with respect to said base member.

* * * * *